United States Patent
Kenney et al.

(10) Patent No.: US 10,435,999 B2
(45) Date of Patent: Oct. 8, 2019

(54) FLUID RELEASE VALVE

(71) Applicant: FLOW CONTROL LLC., Beverly, MA (US)

(72) Inventors: Joel A. Kenney, Beverly, MA (US); Robert W. King, South Hamilton, MA (US)

(73) Assignee: Flow Control LLC, Beverly, MA (US)

(*) Notice: Subject to any disclaimer, the term of this patent is extended or adjusted under 35 U.S.C. 154(b) by 0 days.

(21) Appl. No.: 15/167,260

(22) Filed: May 27, 2016

(65) Prior Publication Data

US 2016/0348471 A1 Dec. 1, 2016

Related U.S. Application Data

(60) Provisional application No. 62/166,943, filed on May 27, 2015.

(51) Int. Cl.
*E21B 34/08* (2006.01)
*E21B 43/12* (2006.01)
(Continued)

(52) U.S. Cl.
CPC .......... *E21B 43/121* (2013.01); *F16K 15/021* (2013.01); *F16K 15/04* (2013.01); *F16K 17/0473* (2013.01); *F16K 17/26* (2013.01)

(58) Field of Classification Search
CPC ...... E21B 43/121; F16K 15/021; F16K 15/04; F16K 17/0473; F16K 17/26
(Continued)

(56) References Cited

U.S. PATENT DOCUMENTS 1,314,070 A 8/1919 McKissick
1,543,179 A 5/1924 Miller et al.
(Continued)

FOREIGN PATENT DOCUMENTS

EP 0709543 5/1996
RU 2150575 6/2000

OTHER PUBLICATIONS

Sump pump check valves from PlumbingSupply.com website printed out on May 28, 2015 (4 pages) https://www.plumbingsupply.com/sump_pump_check_valves.html.
(Continued)

*Primary Examiner* — P. Macade Nichols
(74) *Attorney, Agent, or Firm* — Ware, Fressola, Maguire & Barber (57) ABSTRACT

A fluid release valve includes valve housing (VH) coupled between a pump and an outlet pipe, VH chamber providing fluid from its inlet and outlet when the pump starts, and fluid release orifice (FRO) draining outlet pipe fluid flowing back into the VH when the pump stops; and check valve (CV) combination having a CV shuttle that moves towards/away from the inlet/outlet and an internal shuttle chamber (ISC), and having a CV that moves towards/away from the inlet/outlet within the ISC. The CV combination responds to a pumped fluid pressure when the pump's pumping and stops the fluid from flowing from the inlet around the CV shuttle and out the FRO. The CV combination responds to a fluid differential pressure (FDP) when the pump stops and allows the outlet pipe fluid to drain out the FRO until the FDP reaches an equilibrium.

10 Claims, 7 Drawing Sheets

Cross Section View (51) Int. Cl.
  *F16K 15/02* (2006.01)
  *F16K 15/04* (2006.01)
  *F16K 17/04* (2006.01)
  *F16K 17/26* (2006.01)

(58) Field of Classification Search
  USPC .................................................. 137/512.1
  See application file for complete search history.

(56) References Cited

U.S. PATENT DOCUMENTS

| | | | |
|---|---|---|---|
| 1,660,486 A | 4/1927 | Friend | |
| 2,133,272 A | 2/1935 | Coberly | |
| 2,215,558 A | 12/1938 | Miller | |
| 4,064,896 A * | 12/1977 | Trenary | F16K 15/04 137/218 |
| 4,637,471 A | 1/1987 | Soderberg | |
| 4,645,007 A | 2/1987 | Soderberg | |
| 4,781,213 A | 11/1988 | Kilayko | |
| 4,782,895 A | 11/1988 | Jacob et al. | |
| 4,809,776 A | 3/1989 | Bradley | |
| 4,856,756 A | 8/1989 | Combs | |
| 4,934,452 A | 6/1990 | Bradley | |
| 4,944,349 A | 7/1990 | Von Gonten, Jr. | |
| 4,948,092 A | 8/1990 | Kasper | |
| 5,010,925 A | 4/1991 | Atkinson et al. | |
| 5,310,005 A | 5/1994 | Dollison | |
| 6,289,990 B1 | 9/2001 | Dillon et al. | |
| 6,347,668 B1 | 2/2002 | McNeill | |
| 8,011,901 B2 | 9/2011 | Duncan | |
| 8,281,866 B2 | 10/2012 | Tessier et al. | |
| 2011/0259428 A1 | 10/2011 | Osborne | |
| 2014/0007954 A1 | 1/2014 | Veit et al. | |
| 2016/0334026 A1 | 11/2016 | Wadhwani et al. | |
| 2017/0298601 A1* | 10/2017 | Di Monte, Sr. | E03C 1/1225 |

OTHER PUBLICATIONS

Web pages from ClassicMako Owners Club, Inc. website printed out on May 28, 2015 (12 pages) http://www.classicmako.com/forum/topic.asp?TOPIC_ID=23355.
Sump Pump Replacement/Installation—Non-submersible, Apr. 1, 2008 (7 pages) http://calvin24.blogspot.com/2008/04/sump-pump-replacementinstallalion-non.html.
"ABS Thermoplastic Sump Pump Check Valve—1-¼" Check Valve printed out on May 28, 2015 (2 pages) http://guide.alibaba.com/shop/abs-thermoplastic-sump-pump-check-valve-1-1-4-check-valve_10237137.html.

* cited by examiner

*FIG. 1.1*: Cross Section View

FIG. 1.2: Exploded View

FIG. 1.3: Cross-section

FIG. 1.4: Isometric View

*FIG. 2.1*: General Well Style Installation

FIG. 2.5: System Just Turned Off

FIG. 2.6: Draining

FIG. 3.1A    FIG. 3.1B: Angled side surfaces and a duckbill style check valve (shown closed)

FIG. 3.2: Springs could be added to enhance performance in various applications (lower flow. higher flow, deeper well, etc.).

FLUID RELEASE VALVE

CROSS-REFERENCE TO RELATED APPLICATIONS

This application claims benefit to provisional patent application Ser. No. 62/166,943 (911-005.084-1//FFLJX0020), filed 27 May 2015, which is incorporated by reference in their entirety.

BACKGROUND OF THE INVENTION

1. Field of Invention

The present invention relates to a valve; and more particularly relates to a fluid release value, which may also be known as a pressure relief valve, a drain valve, or a pressure equalization valve.

2. Description of Related Art

Currently, there exists many forms of relief valves which allow a fluid or gas to escape a line or pipe (referred to as "fluid" henceforth). Typically, these valves allow the release of the fluid once that fluid has reached a preset pressure threshold, or in some cases, a certain level of vacuum. Such valves often utilize diaphragms or spring-loaded valves to facilitate the release of a fluid above or below a certain pressure set-point. Typically springs are used for higher pressure release points and diaphragms for lower pressure release points. The very first versions of such relief valves used a weight to seal off the release path until a particular pressure had been achieved within the valve.

Other forms of relief valves only release the fluid upon manual activation by an operator via the use of a lever, knob, or other similar manual activation device. Still others have no spring, diaphragm, weight or other mechanical actuator and are single use, designed to relieve pressure by "blowing" off a component or rupturing a disc. There are also electronic versions of relief valves, e.g., which consist of electronically actuated solenoid valves controlled by a pressure transducer, pressure switch, or other similar activation sensor or device.

In addition to valves designed to release fluid (and therefore also relieve pressure) upon reaching a particular pressure set-point, there also exist many valves designed to drain a line, tank, or other system at low pressures. The simplest of these are manual valves using levers, knobs, or buttons to activate the release of the contained fluid. Some versions of drainage valves are designed to operate automatically, e.g., either using an electronically actuated solenoid valve or a spring loaded valve which works opposite the way the spring-loaded pressure relief valves function: Closing at a pre-set pressure and opening below that pressure threshold to allow the fluid to escape.

Some of the shortcomings of the above mentioned devices include the following:

The devices mentioned previously work well in certain situations but have several shortcomings which make them unsuitable for other applications, particularly the draining of fluid from a system that, during pumping, has low flow and pressure characteristics. Such a situation, which highlights how these existing valve forms can be unsuitable, is the case where a pump is positioned inside of a vertical well. When the time comes to retrieve the pump from the well, the fluid that remains inside of the pipe or hose can add significant weight to be overcome during the retrieval process. This additional weight is especially significant if the retrieval is being undertaken manually. In such a situation it would be advantageous to first drain the fluid out of the pipe or hose, thereby lessening the weight to be lifted and making the retrieval process less physically demanding.

In such a case it is desirable for the valve to only release the fluid once the pump has stopped. Valves which open based upon reaching a high level set-pressure will not work because, if they were set at such a pressure to relieve the fluid at rest, than they would also allow significant volumes of fluid to leak out during normal operation, which is inefficient and wasteful.

Valves which open at a low set-pressure will only work, e.g., if during normal operation of the pump, the pressure developed at the valve location is significantly higher than the pressure at the same location when the pump has stopped operation. With applications such as drip irrigation that produce high levels of backpressure this may be the case but with others, such as flood irrigation, it is unlikely to develop much of a pressure difference. In the flood irrigation example, where there is not a large pressure difference, a valve designed to be forced closed due to the working pressure will not be able to open once the pump has stopped. The reason behind this is because, once the valve seals the fluid release path, there is now an additional force (equal to the pressure difference between the interior of the valve and the exterior well water multiplied by the sealed off area) that is keeping the valve closed. An additional problem with trying to use a low set-pressure valve is that the pressure developed at the valve location will not be constant in many cases as it is dependent on the depth of the well and several other factors. This complicates the approach of trying to use a diaphragm or spring-loaded valve for such situations because the opening force provided by these will remain constant and will not self-adjust to compensate for changes in depth.

Manually and electronically operated valves will allow the column of fluid to be relieved from the hose or pipe when so desired and be independent of pressure and depth, but these systems add additional complexity and cost due to the need for components such as mechanical actuators or electronic connections and solenoids. Also, the ideal spot for full fluid drainage is at the base of the pumped column of fluid. This is typically at the bottom of a well, which makes it a harsh environment to seal electronics in the case of solenoid valves or would require lengthy mechanical actuators in the case of a manually operated valve.

In view of the aforementioned, there is a need in the industry for a better fluid relief valve, e.g., especially for applications related to well style installations.

SUMMARY OF THE INVENTION

Examples of Particular Embodiments

According to some embodiments, and by way of example, the present invention may include, or take the form of, a new and unique fluid release valve for configuring between a pump and an outlet pipe, that features a valve housing and a check valve assembly.

The valve housing may include an inlet to be coupled to a pump and an outlet to be coupled to an outlet pipe. The valve housing may be configured with a valve housing chamber to provide fluid from the inlet to the outlet when the pump starts pumping, and may also be configured with at least one fluid release orifice to drain outlet pipe fluid flowing back through the outlet and into the valve housing when the pump stops pumping.

The check valve assembly may be configured within the valve housing chamber to respond to a pumped fluid pressure when the pump is pumping, allow the fluid to flow from the inlet along a first fluid release path through the check valve assembly to the outlet, and stop the fluid from flowing from the inlet along a second fluid release path around the check valve assembly and out the fluid release orifice, and also configured to respond to a fluid differential pressure when the pump is not pumping, stop the outlet fluid from flowing along the first fluid release path through the check valve assembly, and allow the outlet pipe fluid to drain out the at least one fluid release orifice from the valve housing until a fluid differential pressure between fluid inside and outside the valve housing reaches an equilibrium.

By way of example, the fluid relief valve may include one or more of the following features:

The check valve assembly may be configured as a two-part check valve combination featuring:
- a check valve shuttle configured to move within the valve housing chamber towards and away from the inlet and outlet, and also configured with an internal shuttle chamber, and
- a check valve configured to move within the internal shuttle chamber towards and away from the inlet and outlet.

The check valve shuttle and the check valve may be configured to move independently of one another in relation to the valve housing chamber.

The check valve assembly may be configured to respond to the pumped fluid pressure, allow the fluid to flow from the inlet along the first fluid release path through the check valve shuttle to the outlet, and stop the fluid from flowing from the inlet along the second fluid release path around the check valve shuttle and out the at least one fluid release orifice, and is also configured to respond to the fluid differential pressure, stop the outlet fluid from flowing along the first fluid release path through the check valve shuttle, and allow the outlet pipe fluid to drain out the at least one fluid release orifice from the valve housing until the fluid differential pressure between fluid inside and outside the valve housing reaches the equilibrium.

In the two-part check valve combination, either the check valve shuttle, the check valve, or both, may have a density that is greater than the fluid, so each is sunken in its most downward position when the pump is not pumping.

The valve housing may be configured with a bleed hole to allow the fluid to pass from the valve housing chamber to surrounding fluid outside the fluid relief valve.

The valve housing may include a valve housing outlet side configured with the at least one fluid release orifice to allow the fluid to flow from the inlet along the second fluid release path around the check valve assembly and out the valve housing; and also configured to allow the outlet pipe fluid to drain out from the valve housing until the fluid differential pressure between the fluid inside and outside the valve housing reaches the equilibrium.

The valve housing may include a valve housing outlet side having some combination of a fluid release path inner O-ring seal, a fluid release path outer O-ring seal, or both, configured to seal off the flow fluid out the at least one fluid release orifice, including stopping the fluid from flowing from the inlet along the fluid release path around the check valve shuttle when the pump is pumping the fluid into the valve housing chamber.

The fluid release valve may include one or more springs to aid in the separation of the valve housing and the CV shuttle, or the sealing between the check valve and the CV shuttle, or the upward movement of the CV shuttle towards the valve housing.

The valve housing may include a valve housing outlet side configured with a sealing combination, having a fluid release path inner O-ring seal, a fluid release path outer O-ring seal, or both, to stop the fluid from flowing from the inlet along the second fluid release path around the check valve assembly and out the at least one fluid release orifice; and the one or more springs may include a top spring arranged between the check valve shuttle and the valve housing outlet side and configured to aid the check valve shuttle to separate downwardly from the valve housing outlet side and release the sealing combination between the check valve shuttle and the valve housing outlet side the allow the outlet pipe fluid to drain out the at least one fluid release orifice from the valve housing.

The one or more springs may include an intermediate spring configured between the CV shuttle and the check valve to aid the sealing between the check valve and the CV shuttle.

The one or more springs may include a bottom spring configured between the CV shuttle and valve housing inlet side to aid the upward movement of the CV shuttle towards the valve housing.

The at least one fluid relief orifices may include multiple fluid relief orifices configured in relation to the fluid release path inner and/or outer O-ring seals.

The valve housing may include a conical surface; and the CV shuttle includes a CV shuttle conical surface, the conical surface and the CV shuttle conical surface having corresponding conical surfaces.

The check valve may be configured as a ball or sphere-like structure.

The check valve assembly may include an integral one piece construction that takes the form of a duckbill style check valve in combination with a check valve support member configured to move with the valve housing.

The duckbill style check valve may be configured with a duck bill opening that responds to pumped fluid flowing from the inlet to the outlet and allows the pumped fluid to flow, and that responds to outlet pipe fluid flow and closes.

The fluid differential pressure may be caused by the outlet pipe fluid either flowing back through the outlet and into the valve housing, or flowing out the fluid release orifice reducing the pressure inside the valve housing, or both.

In effect, the main principle of the invention may be summarized as follows: Using the force created by the height of the pumped fluid column to open up fluid release path(s), allowing the draining of fluid and the relief of interior pressure.

Solution to Problem in the Art

The present invention overcomes the above mentioned difficulties as follows:

When using pumps that do not allow for the backflow of fluid through them (diaphragm, helical rotor, etc.) in such a flood irrigation system consistent with that set forth herein, having a release valve that automatically drains the fluid once pump operation has stopped would be advantageous. Additionally, a release valve that is simple and requires no diaphragm/spring assembly or electrical connections would also be advantageous. Ideally such a valve would automatically adjust to variations in well depth without affecting its intended function of releasing fluid once the pump has ceased operating.

The present invention achieves the aforementioned advantages by sealing at low flows and pressures and then automatically opening to release the fluid once the flow has stopped. The valve design is kept simple by not necessitating the use of any diaphragm or spring-loaded piston (although the design is such that these devices could be used to enhance operation if needed). Additionally, no mechanically actuated switch or lever is required and no electronic power is needed. The design is such that, by varying certain parameters, the forces sealing the drainage path(s) and the opposing forces seeking to open the path(s) can be balanced to allow operation across a wide range of well depths.

In effect, the present invention provides a fluid relief valve that is an important contribution to the state of the art, e.g., especially for applications related to well style installations.

BRIEF DESCRIPTION OF THE DRAWING

The drawing includes FIGS. 1.1-3, which are not necessarily drawn to scale, and which are briefly described as follows:

FIG. 1.1 is a cross-sectional view of a fluid release valve; FIG. 1.2 is an exploded view of the fluid release valve in FIG. 1.1; FIG. 1.3 is an exploded cross-sectional view of the fluid release valve in FIG. 1.2; and FIG. 1.4 is an isometric view of the fluid release valve in FIG. 1.1, all according to some embodiments of the present invention.

FIG. 2.1 is a diagram of a general well style installation that includes a fluid release valve, according to the present invention.

FIG. 2.2 is a cross-sectional view of a system having a fluid release valve at rest, according to the present invention.

FIG. 2.3 is a cross-sectional view of the system having fluid release valve in FIG. 2.2 at pump startup, according to the present invention.

FIG. 2.4 is a cross-sectional view of the system having fluid release valve in FIG. 2.3 at steady state, according to the present invention.

FIG. 2.5 is a cross-sectional view of the system having fluid release valve in FIG. 2.4 just turned off, according to the present invention.

FIG. 2.6 is a cross-sectional view of the system having fluid release valve in FIG. 2.5 draining, according to the present invention.

FIG. 3.1A is an isometric view of a fluid release valve, according to some embodiments of the present invention.

FIG. 3.1B is a cross-sectional view of the fluid release valve in FIG. 3.1A, according to some embodiments of the present invention.

FIG. 3.2 is a cross-sectional view of a fluid release valve, according to some embodiments of the present invention.

FIG. 3.3A is an isometric view of a fluid release valve, according to some embodiments of the present invention.

FIG. 3.3B is a cross-sectional view of the fluid release valve in FIG. 3.3A, according to some embodiments of the present invention.

Not every element or arrow in every Figure is labeled with a lead line and reference numeral/label, so as to reduce clutter in the drawing.

DETAILED DESCRIPTION OF BEST MODE OF THE INVENTION

Detailed Description of the Operation of the Present Invention

Brief Operation Summary

In summary, the present invention uses the flow of the fluid for initial closure of fluid release path(s), and subsequently the force due to the pressure differential between the pipe interior and the outside well to keep the fluid release path(s) fully sealed during pump operation. Once pump operation stops and flow has ceased, the device uses the pressure created by the column of fluid to break the seal around the fluid release path(s), allowing drainage of the fluid column. The column of fluid creates enough pressure to break the seal either due to the nature of the flow stopping and "settling" back or, in some embodiments, through use of a small bleed hole or other device in the valve casing which allows a pressure differential to be created after the pump has stopped running.

The Basic Components

This invention has several major physical components. The first consists of a valve housing 1 having an inlet side 1a, an outlet side 1b (although other configurations are certainly possible), and either a single fluid release path 2 or multiple paths. This valve housing 1 may be formed as an assembly of multiple pieces. The pieces would together form a chamber for housing a moving valve assembly. In some situations, it may be desirable to have a small bleed-hole or device 3 positioned somewhere in the valve housing 1 allowing fluid communication between its valve housing interior chamber 10 and the well area exterior to the valve housing 1. Typically, the inlet side 1a of the valve housing 1 would be connected to the outlet of a pump 4 and the outlet side 1b of the valve housing 1 would lead into an outlet pipe or hose 5, e.g., as shown.

The second major component is a "check valve shuttle" (CV shuttle) that is generally indicated as element 6 and has a two part construction 6a, 6b. This component, like the valve housing 1a, 1b, could also be assembled as one piece (see FIGS. 3.3A and 3.3B) or from a plurality of pieces 6a and 6b as shown. This CV shuttle 6, 6a, 6b may be designed to either have positive, neutral, or negative buoyancy in relation to the fluid being pumped depending on the needs of each application. One purpose that the CV shuttle 6a, 6b accomplishes is to seal the fluid release path(s) as well as seal off the flow pathway indicated by 7 around the outside of the CV shuttle 6a, 6b to the pumped fluid column 8. The CV shuttle 6a, 6b also provides a fluid pathway 9 through its CV interior chamber 10 allowing the pumped fluid to travel from the valve-housing inlet side 1a, through a CV shuttle opening 6a1, through the CV shuttle 6a, 6b, around the check valve 11, and up through a CV shuttle opening 6b0 and out to the outlet pipe 5. In this fluid pathway 9, the CV interior chamber 10 is designed to house the check valve 11.

The check valve 11 is contained by the CV shuttle 6a, 6b and could exist in many different embodiments, e.g. as would be appreciate by one skilled in the art. By way of example, one may include a one-piece molded valve (such as a duckbill valve), a ball shape, or some other configuration, e.g., consistent with that disclosed below in relation to FIGS. 3.1A, 3.1B, 3.3A and 3.3B. The main purpose of the check valve 11 is to allow fluid flow up through the valve housing 1 and CV shuttle 6, 6a, 6b during normal operation and prevent backflow of fluid down through the fluid pathway 9 and the CV shuttle 6, 6a, 6b once pump operation has ceased.

In addition to the major physical components, this particular embodiment of the present invention uses a check valve seal/O-ring 12 to create a check valve seat and two other O-ring seals, one inner 13 and one outer 14, to simultaneously seal off the one or more fluid release path(s) 2 and also prevent the flow of liquid along the pathway around 7 the outside of the CV shuttle 6, 6a, 6b. Another valve housing O-ring 15 may be configured or used in this particular embodiment to aid in the sealing between the pieces 1a, 1b of the valve housing 1. Depending on the nature of each application, the fluid release valve generally indicated as 30 may be designed using such seals, or one or more such seals may not be required.

Figure 3:
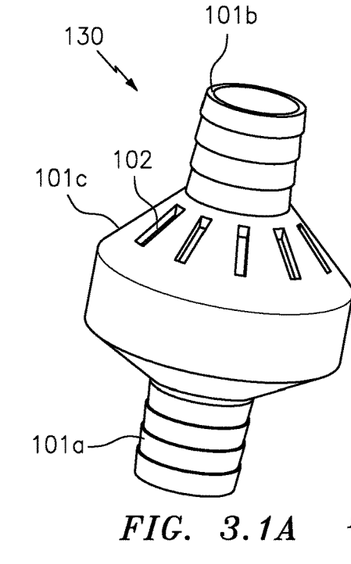
Figure 11:
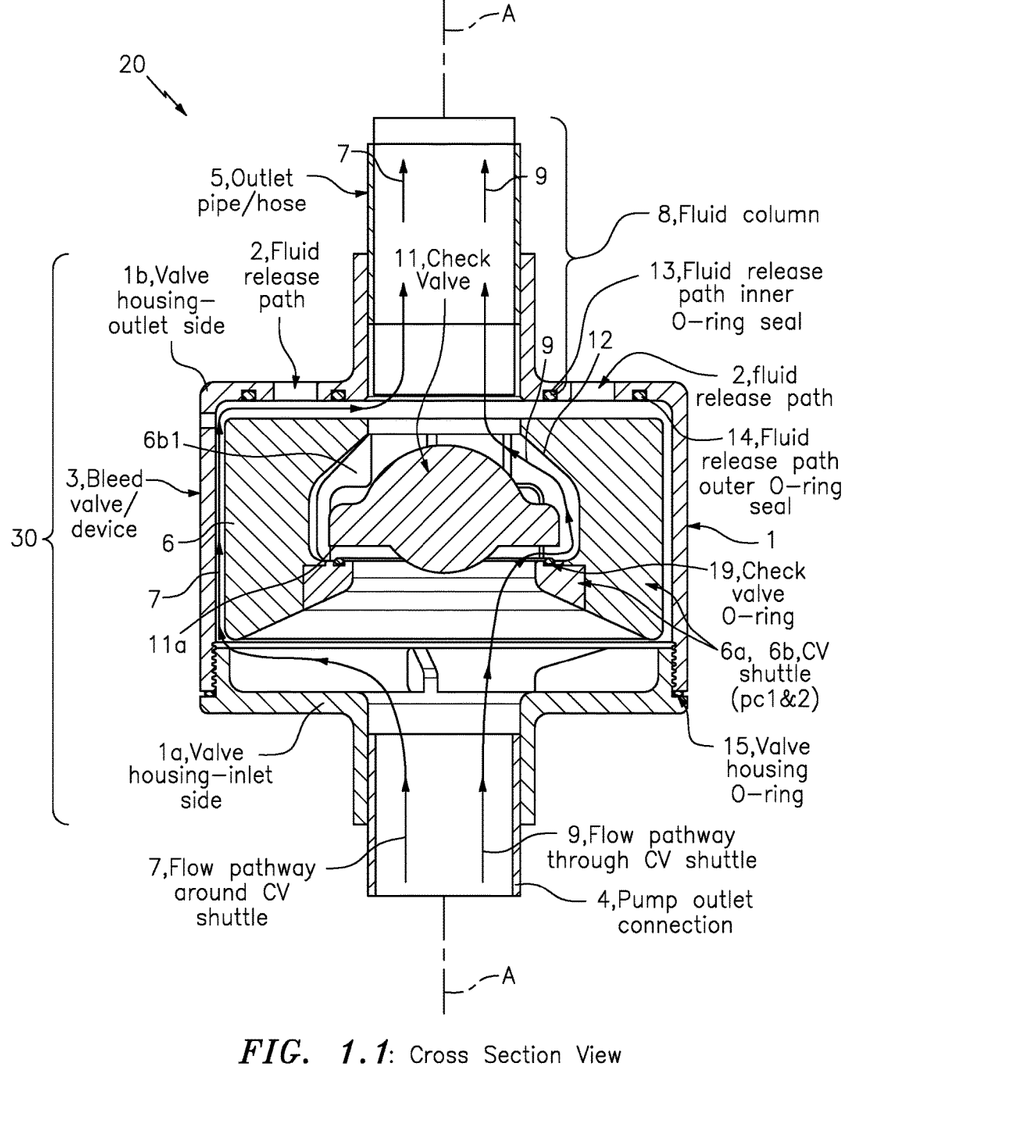
Figure 12:
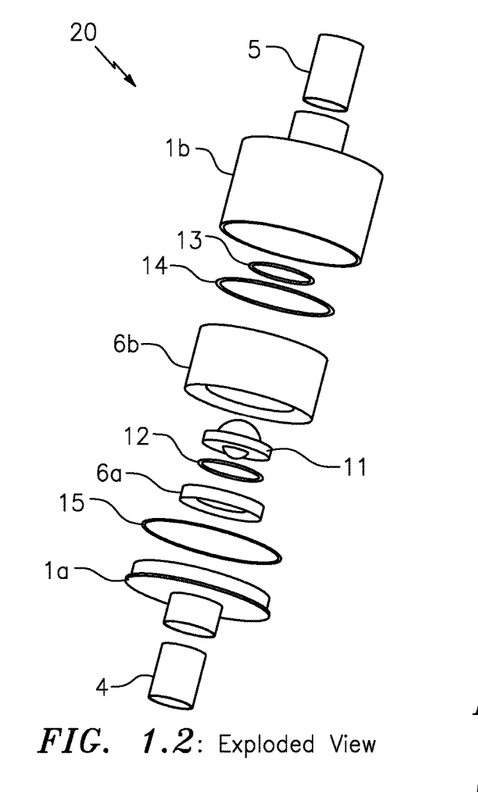
Figure 13:
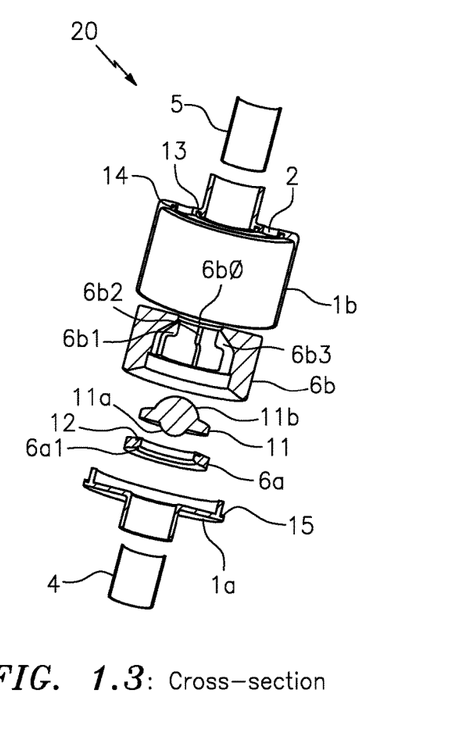
Figure 14:
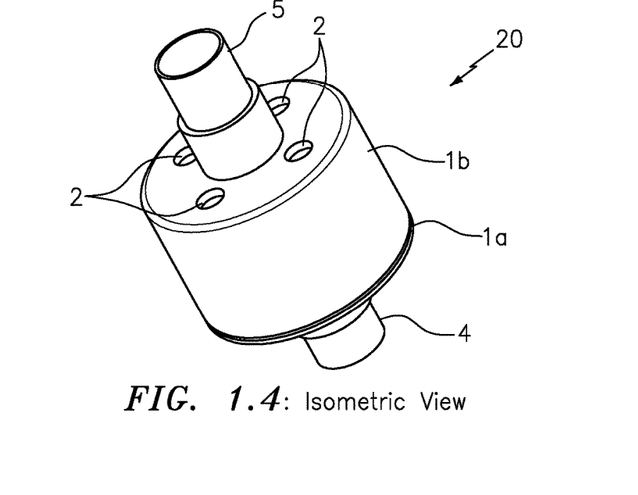
Figure 21:
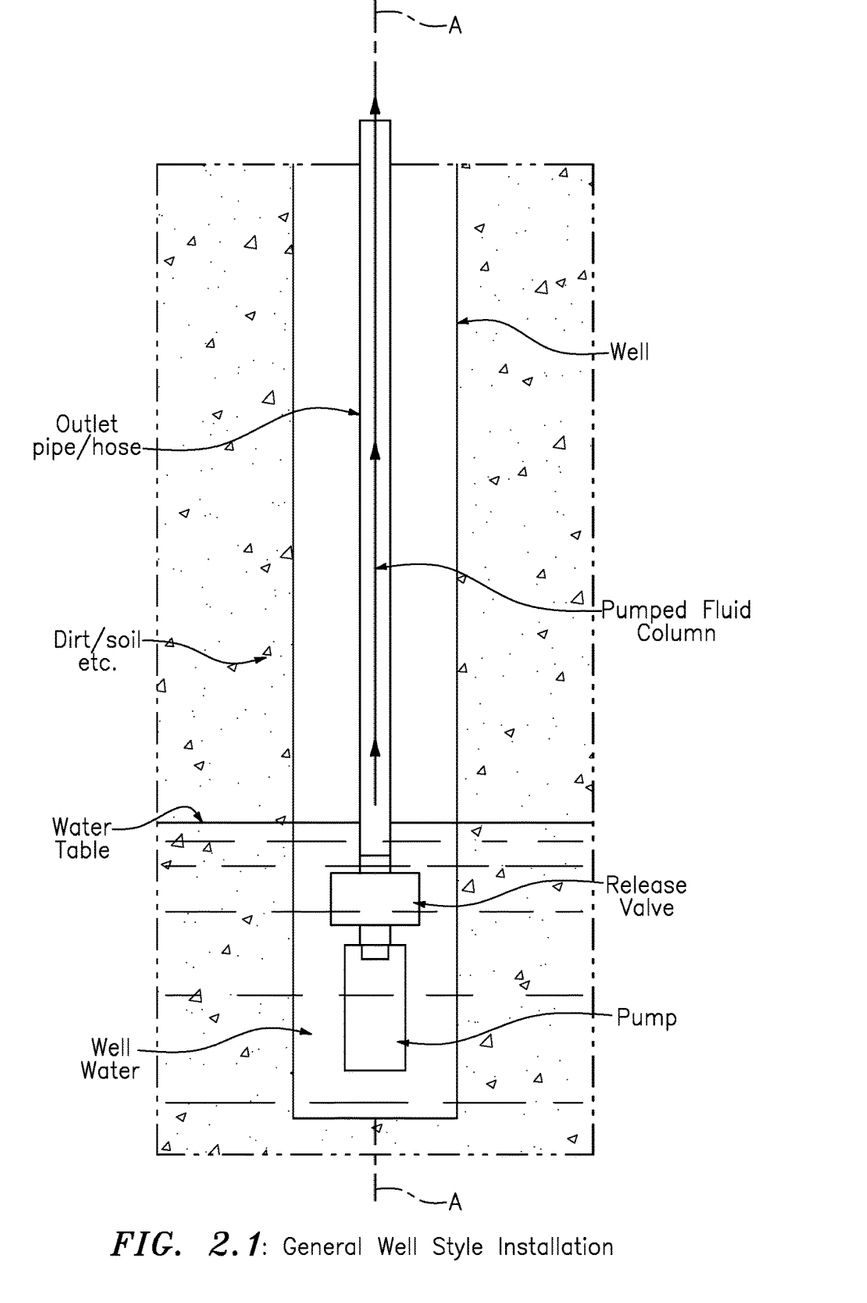

In FIG. 1, the fluid release valve 30 is shown oriented along the vertical axis A, e.g., consistent with that shown in FIG. 2.1 are a general well style installation.

Table 1 with a List of Component Names:

| Item No. | Item Name |
|---|---|
| 1 | Valve housing |
| 1a | Valve housing-inlet side |
| 1b | Valve housing-outlet side |
| 2 | Fluid release path(s) |
| 3 | Bleed-hole/device (if used) |
| 4 | Pump outlet connection |
| 5 | Outlet pipe/hose |
| 6 | CV Shuttle |
| 6a | CV shuttle-piece 1 |
| 6b | CV shuttle-piece 2 |
| 7 | Flow pathway around CV shuttle |
| 8 | Pumped fluid column |
| 9 | Flow pathway through CV shuttle |
| 10 | CV chamber |
| 11 | Check valve |
| 12 | Check valve seat/O-ring |
| 13 | Fluid release path inner O-ring seal |
| 14 | Fluid release path outer O-ring seal |
| 15 | Valve housing O-ring |

FIGS. 2.1 Through 2.6: Detailed Operation Description

FIG. 2.1 shows a general installation, e.g., where the pump is positioned inside of a vertically orientated well with the pump pushing fluid up and out of the well through a pipe through a fluid release valve, all configured along a vertical axis A, e.g., according to the present invention.

Figure 22:
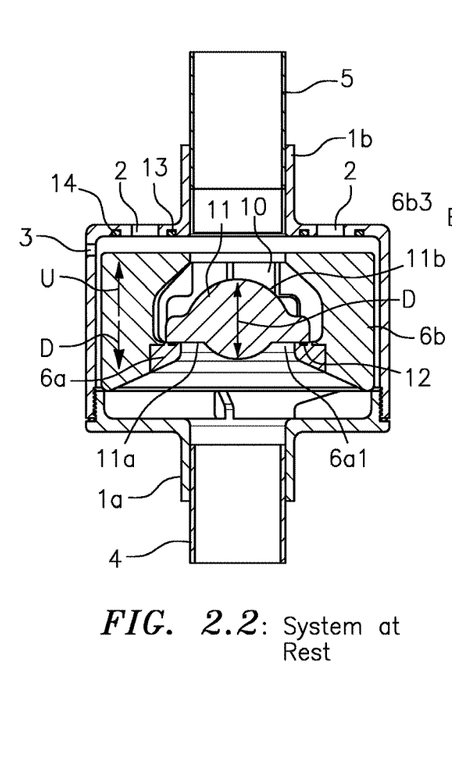

FIG. 2.2: System 20 at Rest

FIG. 2.2 shows a system generally indicated as 20 at rest, e.g., including the fluid release valve generally 30 arranged in relation to the pump outlet connection 4 and the outlet pipe/hose 5. At rest with no flow, the forces acting on the CV shuttle 6a, 6b and check valve 11 experience buoyancy (e.g., indicated by upwardly pointing arrows U) and gravity (e.g., indicated by downwardly pointing arrows D). In this case, since the density of both components is greater than that of the fluid, each component 6a, 6b and 11 is sunken in its most downward position. When at rest in FIG. 2.2, the check valve 11 is immersed in the fluid with the height of the fluid equalized between the inside of the valve outlet pipe 4 and the fluid contained in the well (FIG. 2.1). All pressures due to the fluid, if measured at the same depth, are equal, whether inside the valve housing 1a, 1b or outside. The check valve/CV shuttle combination 6, 6a, 6b, 11, in this particular embodiment, is configured to be negatively buoyant (i.e., denser than the fluid), and therefore is positioned at a lower end of the valve housing 1a with the check valve 11 resting at the lower side of the CV shuttle's inner chamber 10. In FIG. 2.2, a bottom surface 11a of the check valve 11 rests against the check valve seal/O-ring 12 configured in the CV shuttle part 6a and provides a suitable sealing arrangement that close the flow pathway 9 through the CV shuttle 6a, 6b.

Figure 23:
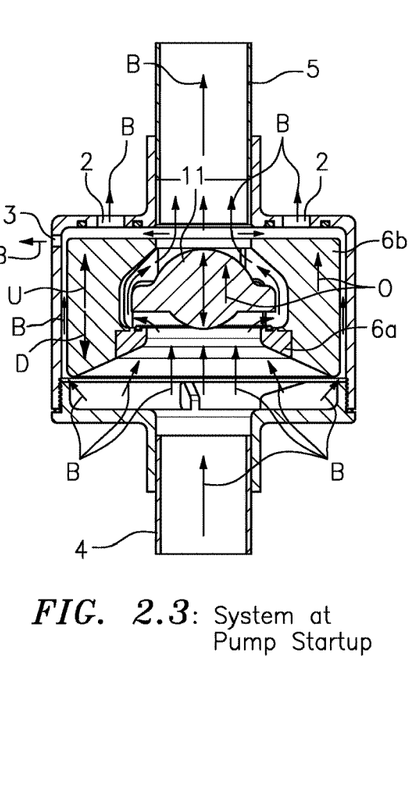

FIG. 2.3: System 20 at Startup

FIG. 2.3 shows the system 20 at startup, where the buoyancy and gravitational forces are still present, but now the upward force due to fluid flow (e.g., indicated by numerous arrows, some of which are labeled B) is also involved, pushing both the check valve 11 and CV shuttle 6a, 6b upwards (see arrows e.g., indicated by O). The CV shuttle part 6b is configured with inner check valve stop portions, e.g., three of which are labeled 6b1, 6b2, 6b3, that rests against a top surface 11b of the check valve 11 when the check valve 11 is positioned like that shown in FIG. 2.3 allowing a flow pathway 9 through the CV shuttle 6a, 6b and around the check valve 11. (Compare with that shown in FIG. 2.2.) At this point, most of the fluid will travel via a flow pathway 9 through the CV shuttle 6a, 6b and up through the outlet pipe 5, but some will also exit through the fluid release paths 2 as well as a small portion may exits through the bleed hole/device 3, if present. Upon startup, the fluid begins flowing into and out of the valve housing 1a, 1b, some fluid flowing via a flow pathway 7 around the exterior of the CV shuttle 6a, 6b, but the majority is guided up through the CV shuttle 6a, 6b around the check valve 11, e.g., as indicated by the numerous arrows B. At this point of operation, a portion of the fluid flowing into the valve housing 1a. 1b is also able to exit through the fluid release path(s) 2. The force of the fluid flow pushes both the check valve 11 and CV shuttle 6a, 6b upwardly until an upper sealing surface of the CV shuttle 6b reaches the valve housing fluid release path(s) seals 13, 14, at which point no more fluid is able to exit through the fluid release path(s) 2. The valve housing outlet side 1b is configured with the valve housing fluid release path(s) seals 13, 14, e.g., by forming grooves or cuts as shown and fitting O-rings/seals 13, 14 therein. The valve housing outlet side 1b is configured with the fluid release path(s) 2 between the grooves or cuts having the O-rings/seals 13, 14 fitted therein.

Figure 24:
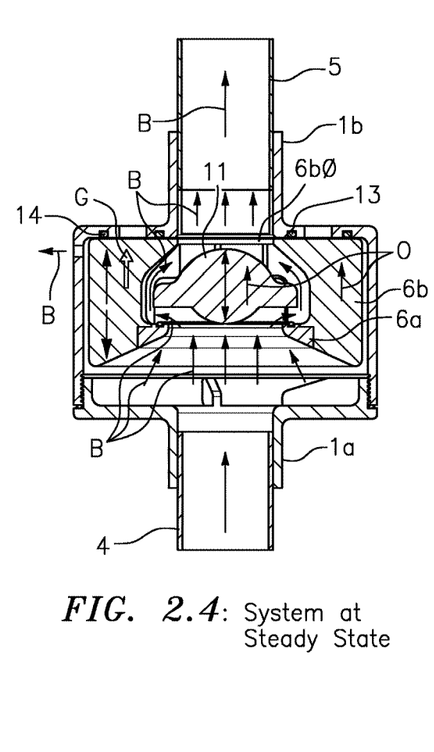

Once the CV shuttle 6b has sealed up against the fluid release path seals 13, 14 and the height of the column of water in the outlet pipe 5 grows, a pressure differential develops between the fluid in the interior of the valve housing and the well fluid (FIG. 2.1). This pressure differential creates an upward force acting on the surface area sealed off by the fluid release path(s) seals 13, 14 and serves to firmly hold the CV shuttle 6b in place against the fluid release path(s) seals 13, 14 of the valve housing 1b. At this point the fluid relief valve 30 has now reached a steady-state operation (see FIG. 2.4) with equal amounts of fluid exiting the valve housing 1b through the valve housing outlet 5 as are entering through the valve housing inlet 1a.

FIG. 2.4: System 20 at Steady State

FIG. 2.4 shows the system 20 at steady state. Once the CV shuttle 6a, 6b has risen up enough to press against the fluid release path seals 13, 14, then it has reached steady state where all of the fluid entering the pump outlet connection 4 also exits via the valve outlet pipe 5 (except for a small portion which may continue to escape through the bleed hole/device if such is present). The forces due to buoyancy, gravity, and flow are all still present. An additional force (e.g., indicated by arrow G) results due to the pressure difference between the outside well water (FIG. 2.1) and the interior pressure of the fluid release valve 30.

Figure 25:
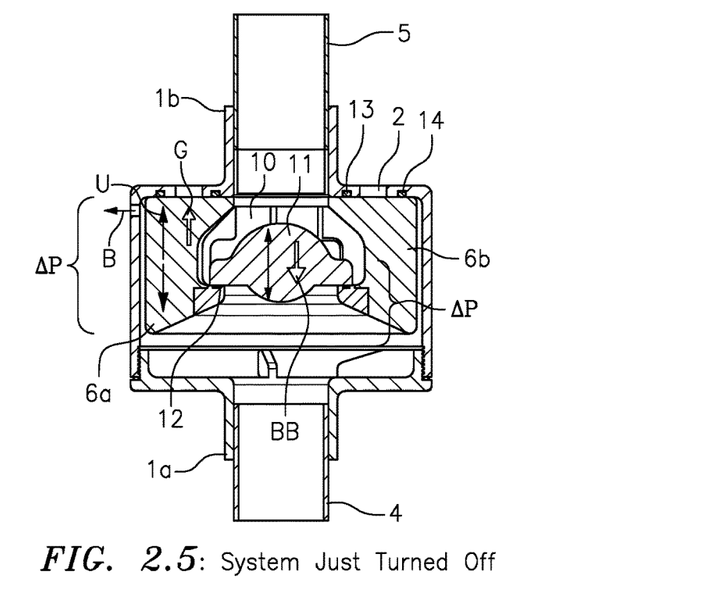

FIG. 2.5: System 20 Just Turned Off

FIG. 2.5 shows the system 20 just turned off. With the pump (FIG. 2.1) shut off, the flow stops and the remaining forces are buoyancy, gravity, the pressure mentioned in FIG. 2.4 (e.g., indicated by arrow G), and now a downward force due to a pressure differential (e.g., indicated by arrow B). This force is either the result of the flowing fluid settling back causing an increase in pressure inside of the CV shuttle chamber 10 (with the now closed check valve 11) or as a result of flow through the bleed hole 3 reducing the pressure in the valve housing 1a, 1b. Once the flow has ceased (FIG. 2.5), the CV shuttle 6a, 6b now has a variety of forces acting upon it. First, there are the forces due to the weight and buoyancy of the check valve 11 and CV Shuttle 6a, 6b. In many cases these are relatively more minor forces and can be considered to have negligible effect. The more dominant forces present include the previously mentioned upward force due to the pressure differential between the well fluid (FIG. 2.1) and the interior of the valve housing acting on the area sealed off by the fluid release path(s) seals 13, 14. This force is counteracted by the downward force created by the pressure at the bottom of the fluid column acting on surface area at the bottom of the area of the check valve seal as well as the portion of the CV shuttle check valve chamber 10 that allows for a vertical component of the force acting on its surface due to the pressure differential ΔP. In some cases these forces can be closely enough balanced (via setting the amount of area sealed off by the fluid release path(s) seals 13, 14 and by the check valve seal 12) that even action of the column of fluid stopping flow and "settling" back down upon losing its upward momentum creates enough of a pressure increase (and therefore pressure differential ΔP) to break the seals 13, 14 between the CV shuttle 6b and the valve housing 1b.

In situations where the fluid "settling" does not create enough of a pressure increase, a small bleed hole like element 3, or alternatively a permeable membrane allowing for fluid communication between the inside of the valve housing and the fluid in the well exterior to the valve, may be added to the CV housing 1b which allows the valve housing interior pressure to reduce down to the same level as that of the exterior well fluid. The disadvantage of using such a bleed hole like element 3 or a such a membrane, would be that during normal operation some leakage of pumped fluid back into the well would occur through it. This leakage could be minimized by reducing the size of the bleed hole like element 3, or the permeability of the membrane, or by adding some form of a small valve. Fortunately, if the volume of fluid contained within the interior of the valve housing 1 is relatively small, then even a small amount of fluid "bleeding" out would allow for quite a significant drop in pressure.

Figure 26:
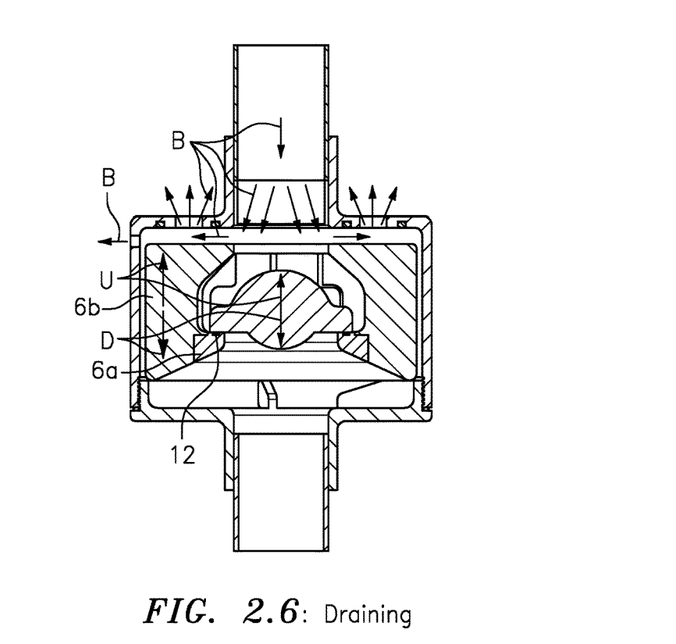

FIG. 2.6: System 20 Draining

FIG. 2.6 shows the system 20 draining. Once the downward forces in FIG. 2.5 are greater than the upward forces (whether due to fluid settling or the effect of fluid bleeding), the CV shuttle 6a, 6b will move downwards, breaking free of the fluid release hole seals 13, 14. This downward movement opens up the fluid release paths 2 and the fluid in the valve outlet pipe 5 will now be able to flow out of the fluid release valve 30 into the well (FIG. 2.1) and will continue to do so until the fluid levels are equalized between the well and the interior of the valve/outlet pipe 5. In other words, once the downward force on the CV shuttle 6a, 6b is enough to overcome any upward forces, the CV shuttle 6a, 6b will move downward, breaking free of the seals 13, 14 surrounding the fluid release path(s) 2 and allowing the fluid column 8 (see FIG. 1) to begin draining (FIG. 2.6) out of the valve housing 1a, 1b and into the well (FIG. 2.1) until pressures and fluid levels are once again equalized. Additionally, as the outlet pipe 5 and pump are pulled up and out of the well, the rest of the fluid contained above the height of the release path(s) 2 will also be drained (since the fluid in the well is no longer surrounding and keeping the fluids at equalized levels).

FIG. 3: Some Further Embodiments

The release valve disclosed in FIGS. 1 and 2.1 through 2.6 is by way of example as one or more embodiments of many possible configurations of the present invention. By way of further example, FIG. 3 shows some of the other variations that may be possible, although it is by no means an exhaustive summary, as those skilled in the art will be able to surmise. Similar elements in FIGS. 1 and 2.1 through 2.6, as well as FIG. 3 are provided with similar reference numeral, or corresponding reference numerals having the addition of some multiple of 100, i.e., 100, 200, 300, etc.

FIGS. 3.1A and 3.1B

For example, FIGS. 3.1A and 3.1B show an embodiment of a fluid release valve generally indicated as 130 having a two-part housing construction with a valve housing inlet side 101a, a valve housing outlet side 101b, and conical surfaces 101c, 101d. The fluid release valve 130 also includes a duckbill style check valve 111 and a duckbill check valve support member 112 (shown closed) arranged inside the two-part housing.

The duckbill style check valve 111 has a duckbill check valve lip 111a that is configured to open in respond to fluid moving from the valve housing inlet side 101a to the valve housing outlet side 101b and allow fluid to pass through the duckbill style check valve 111 and around the duckbill check valve support member 112, e.g., while the pump is pumping fluid into the fluid release valve 130. The conical surface 101c is configured with fluid release paths 102, similar to element 2 in FIG. 1. When the pump is pumping fluid into the fluid release valve 130, the duckbill style check valve 111 and the duckbill check valve support member 112 move from the valve housing inlet side 101a to the valve housing outlet side 101b, and the duckbill check valve support member 112 closes the fluid release paths 102, so that the pumped fluid only flows through the duckbill check valve lip 111a that is open.

When the pump stops pumping, the duckbill check valve lip 111a closes, and the outlet pipe fluid flowing into the fluid relief valve 130 from the valve housing outlet side 101b causes the duckbill style check valve 111 and the duckbill check valve support member 112 to move from the valve housing outlet side 101b to the valve housing inlet side 101a, so that the duckbill check valve support member 112 opens the fluid release paths 102, and the outlet pipe fluid can flow out the fluid release paths 102, as well as some fluid flowing around the duckbill check valve support member 112. The duckbill check valve support member 112 will rest against the valve housing inlet side 101a, and the outlet fluid flow drains through the fluid release paths 102 until the equilibrium is reached.

As one skilled in the art would appreciate, the operation of the fluid release valve 130 is similar to the operation of the fluid release valve 130 in FIGS. 1 and 2.1 through 2.6, and consistent with that set forth herein.

Figure 32:
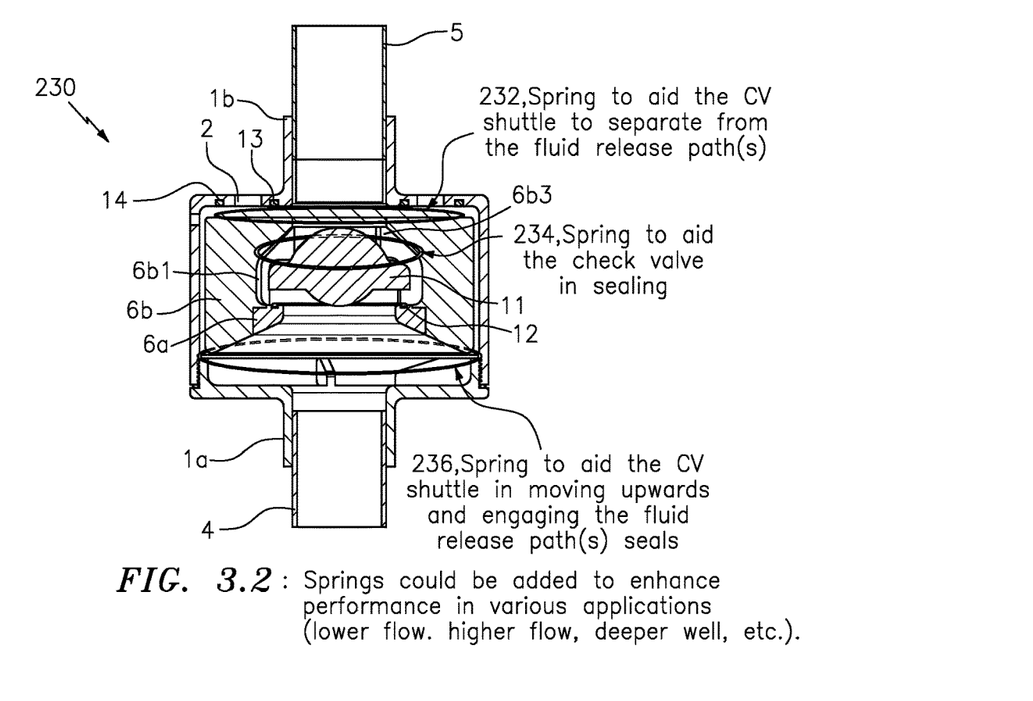

FIG. 3.2

Furthermore, FIG. 3.2 shows an embodiment of a fluid release valve generally indicated as 230, where one or more springs 232, 234, 236 could be added to enhance performance in various applications (lower flow, higher flow, deeper well, etc.). In FIG. 3.2, a top spring 232 may be added to aid the CV shuttle 6a, 6b to separate from the fluid release paths seals 13, 14; an intermediate spring 234 may be added to aid the check valve 11 in sealing against the fluid release path seals 13, 14; and a bottom spring 236 may be added to aid the CV shuttle 6a, 6b in moving upwards and engaging the fluid release paths seals 13, 14. As a person skilled in the art would appreciate, the operation of the fluid release valve 230 is similar to the operation of the fluid release valve 130 in FIGS. 1 and 2.1 through 2.6.

FIGS. 3.3A and 3.3B

For example, FIGS. 3.3A and 3.3B show an embodiment of a fluid release valve generally indicated as 330 having a valve housing 301 with a valve housing inlet side 301a, a valve housing outlet side 301b, and a conical surface 301c. The fluid release valve 330 also includes a CV shuttle 306 and a ball 311 to act as a check valve (shown closed) arranged inside the two-part housing construction. The CV shuttle 306 is configured or formed with a CV shuttle opening 306a, a CV shuttle conical surface 306b and a CV shuttle opening 306c. The conical surface 301c and the CV shuttle conical surface 306b are configured with corresponding conical surfaces, e.g., consistent with that shown in FIGS. 3.3A and 3.3B. The angled surface 301c is configured with fluid release paths 302, similar to element 2 in FIG. 1. As a person skilled in the art would appreciate, the operation of the fluid release valve 330 is similar to the operation of the fluid release valve 30 in FIGS. 1 and 2.1 through 2.6, e.g., with the valve housing 301 corresponding to the valve housing combination 1a, 1b; the CV shuttle combination 6a, 6b corresponding to the CV shuttle 306; and the check valve 11 corresponding to the check valve ball 311.

In effect, the configuration outlined in the main body of this patent application in relation to FIGS. 1 and 2.1 through 2.6 is just one of many possible designs for the fluid release valve according to the present invention. Some other variations (although not an exhaustive list) are outlined in FIG. 3 above. Note that all embodiments still would be using the main principle of the invention: Using the force created by the height of the pumped fluid column to open up fluid release path(s), allowing the draining of fluid and the relief of interior pressure inside the fluid release valve.

Possible Applications

By way of example, possible applications may include the following:
1) Draining a pipe or hose column (vertical or slanted) for reasons such as reducing the weight to make retrieval easier.
2) Draining a pipe or hose column (vertical or slanted) for any other reason.
3) Relieving pressure in a line or chamber—vertical, horizontal, or other—for any reason.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A fluid release valve for configuring between a pump and an outlet pipe, comprising:
   a valve housing having an inlet to be coupled to a pump, having an outlet to be coupled to an outlet pipe, configured with a valve housing chamber to provide a fluid from the inlet to the outlet when the pump starts pumping, and configured with at least one fluid release orifice to drain outlet pipe fluid flowing back through the outlet and into the valve housing when the pump stops pumping; and
   a check valve assembly configured within the valve housing chamber to respond to a pumped fluid pressure when the pump is pumping, allow the fluid to flow from the inlet along a first fluid release path through the check valve assembly to the outlet, and stop the fluid from flowing from the inlet along a second fluid release path around the check valve assembly and out the fluid release orifice, and also configured to respond to a fluid differential pressure when the pump is not pumping, stop an outlet fluid from flowing along the first fluid release path through the check valve assembly, and allow the outlet pipe fluid to drain out the fluid release orifice from the valve housing until a fluid differential pressure between fluid inside and outside the valve housing reaches an equilibrium;
   wherein the check valve assembly is configured as a two-part check valve combination comprising:
      a check valve shuttle configured to move within the valve housing chamber towards and away from the inlet and outlet and also configured with an internal shuttle chamber, and
      a check valve configured to move within the internal shuttle chamber towards and away from the inlet and outlet; and
   wherein the check valve assembly is configured to respond to the pumped fluid pressure, allow the fluid to flow from the inlet along the first fluid release path through the check valve shuttle to the outlet, and stop the fluid from flowing from the inlet along the second fluid release path around the check valve shuttle and out the at least one fluid release orifice, and is also configured to respond to the fluid differential pressure, stop the outlet fluid from flowing along the first fluid release path through the check valve shuttle, and allow the outlet pipe fluid to drain out the at least one fluid release orifice from the valve housing until the fluid differential pressure between fluid inside and outside the valve housing reaches the equilibrium.

2. A fluid release valve for configuring between a pump and an outlet pipe, comprising:

a valve housing having an inlet to be coupled to a pump, having an outlet to be coupled to an outlet pipe, configured with a valve housing chamber to provide a fluid from the inlet to the outlet when the pump starts pumping, and configured with at least one fluid release orifice to drain outlet pipe fluid flowing back through the outlet and into the valve housing when the pump stops pumping; and a check valve assembly configured within the valve housing chamber to respond to a pumped fluid pressure when the pump is pumping, allow the fluid to flow from the inlet along a first fluid release path through the check valve assembly to the outlet, and stop the fluid from flowing from the inlet along a second fluid release path around the check valve assembly and out the fluid release orifice, and also configured to respond to a fluid differential pressure when the pump is not pumping, stop an outlet fluid from flowing along the first fluid release path through the check valve assembly, and allow the outlet pipe fluid to drain out the fluid release orifice from the valve housing until a fluid differential pressure between fluid inside and outside the valve housing reaches an equilibrium;

wherein the check valve assembly is configured as a two-part check valve combination comprising:
 a check valve shuttle configured to move within the valve housing chamber towards and away from the inlet and outlet and also configured with an internal shuttle chamber, and
 a check valve configured to move within the internal shuttle chamber towards and away from the inlet and outlet; and
wherein in the two-part check valve combination either the check valve shuttle, the check valve, or both, have a density that is greater than the fluid, so each is sunken in its most downward position when the pump is not pumping.

3. The fluid release valve according to claim 1, wherein the fluid differential pressure is caused by the outlet pipe fluid either flowing back through the outlet and into the valve housing, or flowing out the at least one fluid release orifice reducing the pressure inside the valve housing, or both.

4. The fluid release valve according to claim 1, wherein the valve housing is configured with a bleed hole to allow the fluid to pass from the valve housing chamber to surrounding fluid outside the fluid relief valve.

5. The fluid release valve according to claim 1, wherein the valve housing comprises a valve housing outlet side configured with the at least one fluid release orifice to allow the fluid to flow from the inlet along the second fluid release path around the check valve assembly and out the valve housing; and also configured to allow the outlet pipe fluid to drain out from the valve housing until the fluid differential pressure between the fluid inside and outside the valve housing reaches the equilibrium.

6. A fluid release valve for configuring between a pump and an outlet pipe, comprising:
 a valve housing having an inlet to be coupled to a pump, having an outlet to be coupled to an outlet pipe, configured with a valve housing chamber to provide a fluid from the inlet to the outlet when the pump starts pumping, and configured with at least one fluid release orifice to drain outlet pipe fluid flowing back through the outlet and into the valve housing when the pump stops pumping; and
 a check valve assembly configured within the valve housing chamber to respond to a pumped fluid pressure when the pump is pumping, allow the fluid to flow from the inlet along a first fluid release path through the check valve assembly to the outlet, and stop the fluid from flowing from the inlet along a second fluid release path around the check valve assembly and out the fluid release orifice, and also configured to respond to a fluid differential pressure when the pump is not pumping, stop an outlet fluid from flowing along the first fluid release path through the check valve assembly, and allow the outlet pipe fluid to drain out the fluid release orifice from the valve housing until a fluid differential pressure between fluid inside and outside the valve housing reaches an equilibrium;
 wherein the valve housing comprises a valve housing outlet side having some combination of a fluid release path inner O-ring seal, a fluid release path outer O-ring seal, or both, configured to seal off the flow fluid out the at least one fluid release orifice, including stopping the fluid from flowing from the inlet along the fluid release path around a check valve shuttle when the pump is pumping the fluid into the valve housing chamber.

7. A fluid release valve for configuring between a pump and an outlet pipe, comprising:
 a valve housing having an inlet to be coupled to a pump, having an outlet to be coupled to an outlet pipe, configured with a valve housing chamber to provide a fluid from the inlet to the outlet when the pump starts pumping, and configured with at least one fluid release orifice to drain outlet pipe fluid flowing back through the outlet and into the valve housing when the pump stops pumping; and
 a check valve assembly configured within the valve housing chamber to respond to a pumped fluid pressure when the pump is pumping, allow the fluid to flow from the inlet along a first fluid release path through the check valve assembly to the outlet, and stop the fluid from flowing from the inlet along a second fluid release path around the check valve assembly and out the fluid release orifice, and also configured to respond to a fluid differential pressure when the pump is not pumping, stop an outlet fluid from flowing along the first fluid release path through the check valve assembly, and allow the outlet pipe fluid to drain out the fluid release orifice from the valve housing until a fluid differential pressure between fluid inside and outside the valve housing reaches an equilibrium;
 wherein the check valve assembly is configured as a two-part check valve combination comprising:
  a check valve shuttle configured to move within the valve housing chamber towards and away from the inlet and outlet and also configured with an internal shuttle chamber, and
  a check valve configured to move within the internal shuttle chamber towards and away from the inlet and outlet; and
  wherein the fluid release valve comprises one or more springs to aid in the separation of the valve housing and the check valve shuttle, or a sealing between the check valve and the check valve shuttle, or an upward movement of the check valve shuttle towards the valve housing.

8. The fluid release valve according to claim 7, wherein the valve housing has a valve housing outlet side configured with a sealing combination, having a fluid release path inner O-ring seal, a fluid release path outer O-ring seal, or both, to stop the fluid from flowing from the inlet along the second fluid release path around the check valve assembly and out the fluid release orifice; and the one or more springs include a top spring arranged between the check valve shuttle and the valve housing outlet side and configured to aid the check valve shuttle to separate downwardly from the valve housing outlet side and release the sealing combination between the check valve shuttle and the valve housing outlet side the allow the outlet pipe fluid to drain out the fluid release orifice from the valve housing.

9. The fluid release valve according to claim 7, wherein the one or more springs include an intermediate spring configured between the check valve shuttle and the check valve to aid the sealing between the check valve and the check valve shuttle.

10. The fluid release valve according to claim 7, wherein the one or more springs include a bottom spring configured between the check valve shuttle and valve housing inlet side to aid an upward movement of the check valve shuttle towards the valve housing.

* * * * *

UNITED STATES PATENT AND TRADEMARK OFFICE
CERTIFICATE OF CORRECTION

Page 1 of 1

PATENT NO.        : 10,435,999 B2
APPLICATION NO.   : 15/167260
DATED             : October 8, 2019
INVENTOR(S)       : Joel A. Kenney and Robert W. King It is certified that error appears in the above-identified patent and that said Letters Patent is hereby corrected as shown below:

In the Claims

In Column 14, Line 60, which is Claim 7, Line 37, "check valve" should be -- CV --.

In Column 14, Line 60, which is Claim 7, Line 37, "a" should be -- the --.

In Column 14, Line 61, which is Claim 7, Line 38, "check valve" should be -- CV --.

In Column 14, Line 61, which is Claim 7, Line 38, "an" should be -- the --.

In Column 14, Line 62, which is Claim 7, Line 39, "check valve" should be -- CV --.

Signed and Sealed this
Second Day of February, 2021

Drew Hirshfeld
*Performing the Functions and Duties of the
Under Secretary of Commerce for Intellectual Property and
Director of the United States Patent and Trademark Office*